Figure 1:
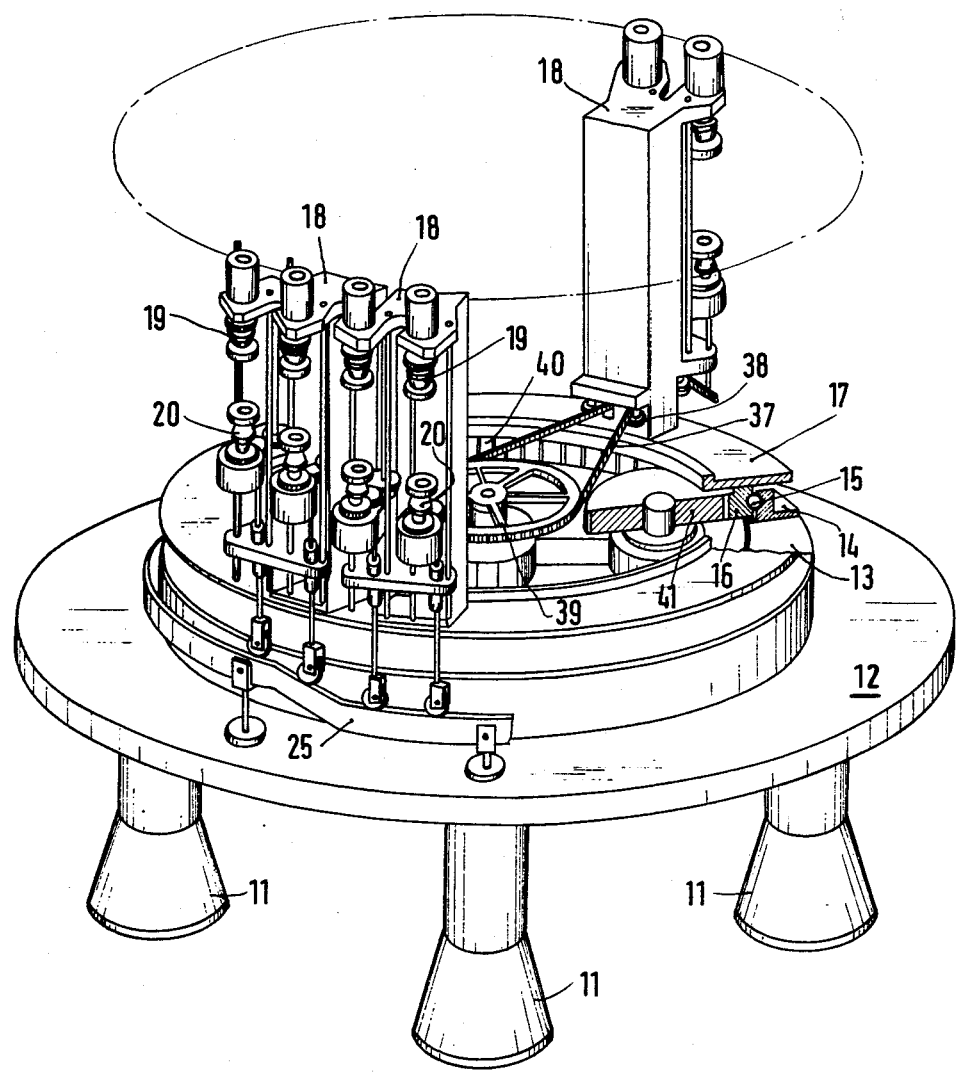

United States Patent [19]

Dichter

[11] 4,080,189
[45] Mar. 21, 1978

[54] MACHINE FOR MANUFACTURING PHIALS, AMPOULES OR THE LIKE FROM THERMOPLASTIC SUBSTANCES, IN PARTICULAR GLASS

[76] Inventor: Hans-Joachim Dichter, Sachsendamm 93, 1000 Berlin 62, Germany

[21] Appl. No.: 759,175

[22] Filed: Jan. 13, 1977

[30] Foreign Application Priority Data

Jan. 23, 1976 Germany .............................. 2602943

[51] Int. Cl.² ............................................ C03B 23/12
[52] U.S. Cl. ...................................... 65/276; 65/280; 65/323
[58] Field of Search ................ 65/227, 276, 159, 280, 65/323; 221/11, 83, 105

[56] References Cited

U.S. PATENT DOCUMENTS 2,961,800  11/1960  Bates ...................................... 65/155

FOREIGN PATENT DOCUMENTS 490,333  2/1954  Italy ....................................... 65/280

*Primary Examiner*—Arthur D. Kellogg
*Attorney, Agent, or Firm*—Parmelee, Johnson, Bollinger & Bramblett

[57] ABSTRACT

The invention relates to a machine for manufacturing phials, ampoules or the like from thermoplastic substances, in particular glass, having a number of holders capable of rotating around their own axes and around a central axis, which are distributed around the circumference of the machine and are supported on a frame in the nature of a turntable, whose axis of rotation constitutes the central axis. The holders are mounted on segment-like carriers which together form a cylinder, and which are fastened to a support ring mounted on part of a ball race.

10 Claims, 2 Drawing Figures

MACHINE FOR MANUFACTURING PHIALS, AMPOULES OR THE LIKE FROM THERMOPLASTIC SUBSTANCES, IN PARTICULAR GLASS

The invention relates to a machine for manufacturing phials, ampoules or the like from thermoplastic substances, in particular glass, having a number of holders capable of rotating around their own axes and around a central axis, which are distributed around the circumference of the machine and are supported on a frame in the nature of a turntable, whose axis of rotation constitutes the central axis.

Machines of the above type exist, which have a central shaft in the vicinity of their centre axis, to which is firmly fastened at least one ring carrying the holders on its circumference (DT-PS 1,301,879). Two rings connected to one another by struts, each ring carrying part of the holders, are used in machines having upper and lower holders, i.e, in machines suitable in particular for the manufacture of ampoules (DT-PS 889,970).

Existing machines fail to give complete satisfaction for a number of reasons. Firstly, the central shafts and rings must be strongly constructed in order to ensure sufficiently rigid positioning of the holders. This results in heaviness of the machine, which constitutes a particularly critical factor in cases where the machine cannot be installed on the ground floor of a factory building. The weight problem becomes particularly critical with machines having a large number of work positions, i.e. a large outside diameter. In view of their large output per unit of time, however, such machines offer the advantage of great economy. Other reasons are that with existing machines having upper and lower holders, adjustment of these causes problems in installation. Furthermore, the unavoidable unevenness of thermal stresses at various points of the rings of known machines can lead to undesirable tensile stress and consequent deformation of the machine frame. Finally, the design of known machines prevents extensive application of the module principle.

The invention is based on the task of designing a machine of the type described at the outset which, though it has a large number of holders distributed around its circumference, can be of relatively light design and allow greater use of the module principle.

The invention solves this problem in that all of the holders are mounted on segment-like carriers forming a cylinder, the carriers being fastened to a support ring formed by, or supported on, part of a ball race.

This invention thus provides a machine for manufacturing phials, ampoules or the like from thermoplastic substances, in particular glass, having a number of holders capable of rotating around their own axes and around a central axis, which are distributed around the circumference of the machine and are supported on a frame in the nature of a turntable, whose axis of rotation constitutes the central axis, characterized in that the holders are mounted on segment-like carriers which together form a cylinder, and which are fastened to a support ring mounted on part of a ball race.

The machine according to the invention affords the advantage that the holders may be mounted beforehand on the segment-shaped carriers which may then be fastened to the support ring. Depending on the dimensions of the support ring, a greater or lesser number of carriers may be accommodated on the support ring. Because there is no central shaft, the inside of the machine bounded by the carriers is unobstructed and may, if required, be used to accommodate control assemblies, cooling fans, etc.

The invention is described hereinafter on the basis of the accompanying drawings, which are:

FIG. 1 A simplified perspective representation of a machine, in which only three segment-shaped carriers are shown in the interest of greater clarity.

Figure 2:
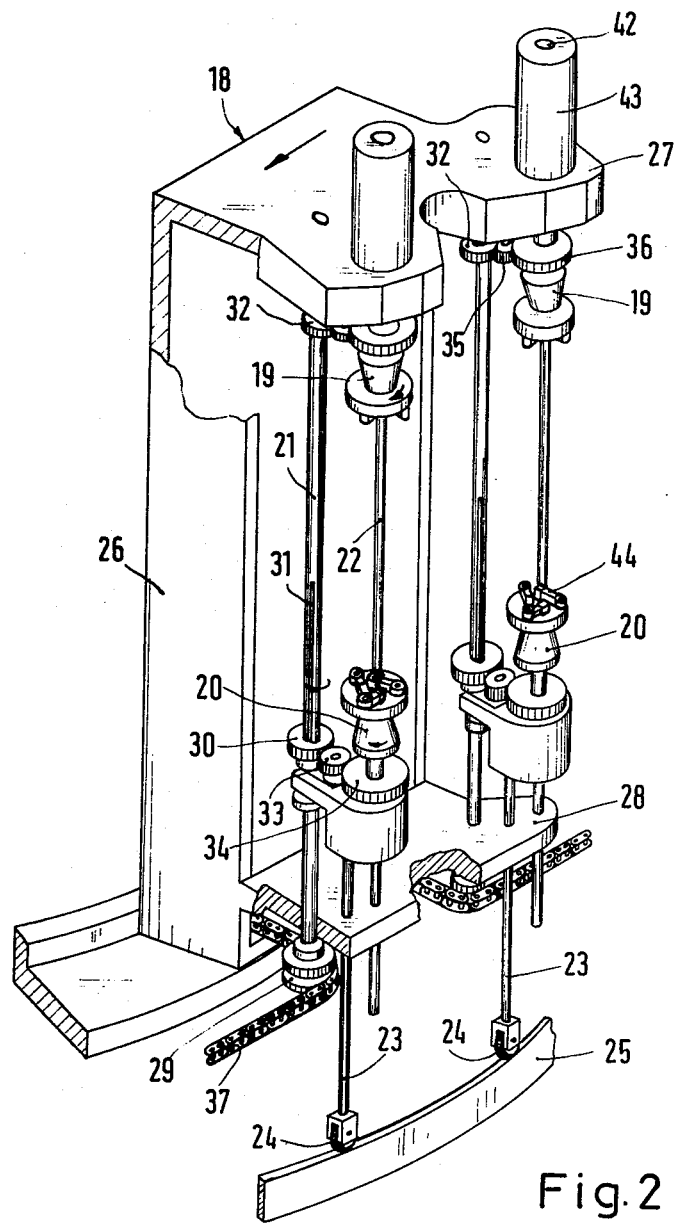

FIG. 2 A representation of a single carrier, also in perspective, and to a larger scale.

In FIG. 1, 11 refers to three of four supports which carry a ring-shaped frame 12. Processing devices as known in other machines cannot be mounted on this frame. To a ring-shaped pedestal 13 is fastened the outer race 14 of a ball bearing ring, which connects through balls 15 or other rolling components with the inner race 16, which in turn carries a support ring 17.

On the support ring 17 are mounted numerous segment-like carriers 18 adjacent to one another. As shown in FIG. 2, each carrier 18 is equipped with two upper holders 19 and two lower holders 20. The lower holders 20 are able to move up and down on two guide rods 21 and 22. A control rod 23 running on at least one running wheel 24 provides up and down motion as it passes along a scrolled track 25.

Each carrier 18 consists of a box-shaped structure 26 with projecting guide plates 27 and 28. Guide rods 21 and 22 are seated in guide plates 27 and 28. The guide rods 21 are free to rotate. They are fitted at the lower end with sprocket wheels 29. A gear 30 is also mounted on the rods, able to slide axially thereon together with the lower holders. The gear is carried along by a spring fitting into a slot 31. Finally, another gear 32 is fixed to the upper end of guide rod 21. The gears 30 drive a gear 34 fixed to the lower holders 20 through idler wheels 33. The gears 32 are geared through idler wheels 35 to gears 36 driving the upper holders 19.

The chain 37 driving the sprockets 29 runs from a carrier 18, the rear of which is provided with additional sprockets 38, to a central sprocket 39. It is also geared to all the sprockets 29 of the guide rods 21. A motor and reduction gear, not shown, drives sprocket 39.

The inner race 16 of the ball bearing ring is fitted with a ring gear 40. This ring gear is geared to a drive pinion 41, which is also driven by a motor and a reduction gear (not shown).

The above description clearly shows that the individual carriers 18 may be pre-assembled and thus constitute complete structural modules. A greater or lesser number of carriers may be used according to the diameter of the support ring 17. The same carriers may therefore be used in machines of different size. Deformations in one carrier due to particularly high thermal stresses are not transmitted to the other carriers, which increases the operating precision of the machine.

The machine subject of the invention works as follows: Glass tubing is inserted from above through the openings 42 in guide cylinders 43 into the upper holders 19 and is first heated by burners mounted on the frame 12 at the various work positions. Once the tubes have passed through a number of stations and been provided with a base, the lower holders 20 are moved upwards to grasp the glass tubes with their gripper units 44. As soon as they have grasped a tube, the lower holders move downward while the tube is continuously heated. This stretches the glass tube and produces, for example, the neck of an ampoule. The machine then functions in a similar manner as other well-known glass processing machines, requiring no special explanation at this point.

I claim:

1. A machine for manufacturing phials, ampoules and the like from thermoplastic substances, in particular glass, said machine including a plurality of holders and a frame in the nature of a turntable for supporting said holders, said holders being positioned on the circumference of said frame, means for rotating said frame around a central axis, and a common means for rotating each of said holders around their own respective axis, wherein said holders are mounted within a plurality of segment-like carriers, said holders and segment-like carriers together form a cylinder, said holders and segment-like carriers being fastened to a support ring mounted on part of a ball race which is supported by said frame, each of said carriers comprising a complete structural module enabling the number of individual said carriers mounted on said support ring to be pre-determined and each of said structural modules including means to cooperate with said common means for rotating its respective holders around their own axes.

2. A machine as claimed in claim 1, characterized in that the inner race of the ball bearing ring or the support ring is fitted with an internal ring gear, driven by a pinion which provides rotation to the support ring.

3. A machine as claimed in claim 1, characterized in that a sprocket is positioned in the vicinity of the central axis of the machine, to drive a chain which in turn drives sprockets mounted on the carriers to rotate the holders around their own axes.

4. A machine as claimed in claim 1, characterized in that two upper holders and two lower holders are mounted on each carrier.

5. A machine as claimed in claim 4, characterized in that at least part of the holders are moved upward and downward on the carriers in the direction of their axis of rotation.

6. A machine as claimed in claim 5, characterized in that the lower holders are capable of being moved up and down.

7. A machine as claimed in claim 1, characterized in that the carriers form a box-shaped structure with projecting guide plates to retain the holders.

8. A machine as claimed in claim 3, characterized in that the sprockets on the carriers are fitted to free-rotating guide rods which carry gears to drive the holders which are also fitted with gears.

9. A machine as claimed in claim 1, characterized in that the inner space enclosed by the carriers is equipped with a cooling fan.

10. A machine as claimed in claim 2, characterized in that a sprocket is positioned in the vicinity of the central axis of the machine, to drive a chain which in turn drives sprockets mounted on the carriers to rotate the holders around their own axes.

* * * * *